Nov. 7, 1939.  S. H. CALDWELL  2,178,986
WARNING DEVICE FOR MOTOR VEHICLES
Filed Oct. 5, 1936
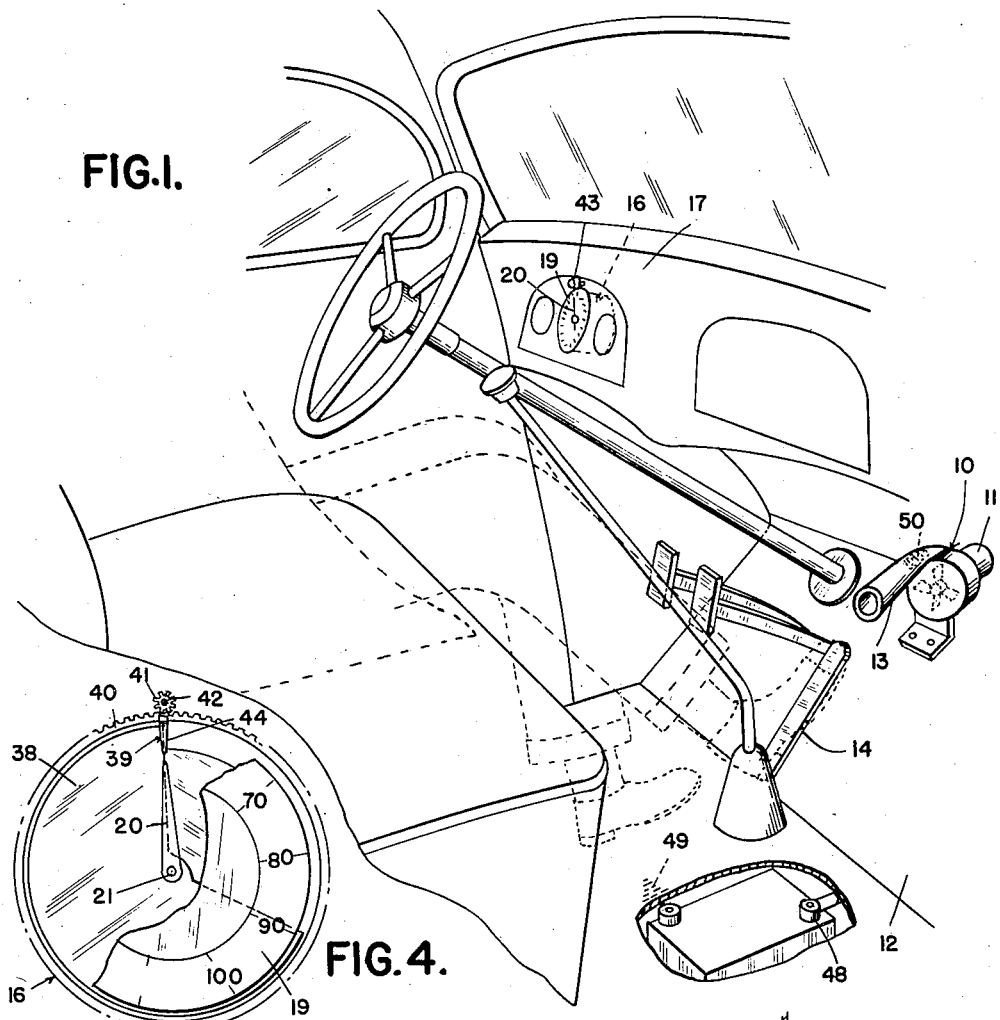
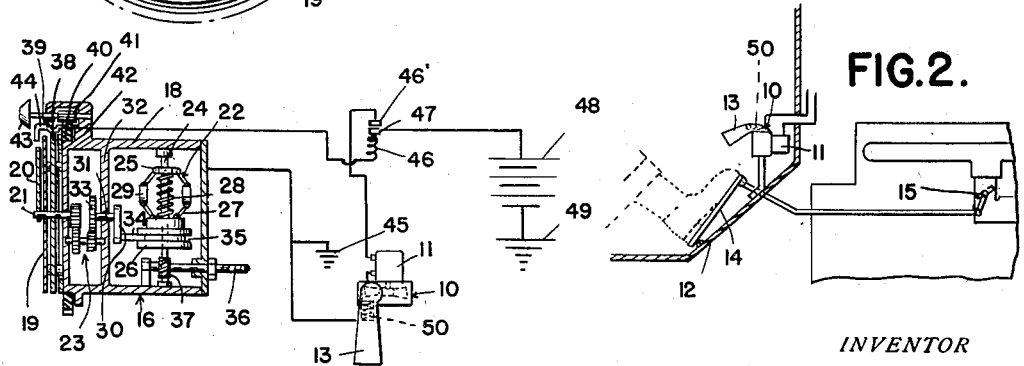
INVENTOR
STUART H. CALDWELL
BY *Whittemore Hulbert & Belknap*
ATTORNEYS Patented Nov. 7, 1939

2,178,986

UNITED STATES PATENT OFFICE 2,178,986

WARNING DEVICE FOR MOTOR VEHICLES

Stuart H. Caldwell, Detroit, Mich., assignor to Kelch Heater Company, Detroit, Mich., a corporation of Michigan Application October 5, 1936, Serial No. 104,109

6 Claims. (Cl. 177—324)

This invention relates generally to motor vehicles and refers more particularly to means for indicating to the operator when the rate of travel of the vehicle exceeds a preselected speed.

One of the principal objects of this invention resides in the provision of means effective when the vehicle exceeds a preselected rate of travel to impart a signal to the operator indicating that the desired speed is being exceeded without, however, restricting or interfering in any way with the operation of the vehicle throughout the remainder of the speed range. In a great many instances, serious accidents are avoided by quickly accelerating the vehicle, and this may be accomplished in the usual manner because the signal does not interfere with the conventional manipulation of the throttle control by either resisting actuation of the latter, or requiring any unusual movements on the part of the operator.

Another feature of this invention consists in the provision of a signal embodying means effective when the vehicle exceeds a preselected speed to direct a current of warm air against a part of the anatomy of the operator with sufficient force to be noticeable by and indicate to the operator that the desired speed is being exceeded.

A further object of the present invention consists in the provision of a signal of the character previously set forth operated by the speed indicating instrument when the latter reaches a point preselected by the operator through a suitable hand operated control conveniently located in the driver's compartment of the vehicle for manipulation.

The foregoing, as well as other objects, will be made more apparent as this description proceeds, especially when considered in connection with the accompanying drawing, wherein:

Figure 1 is a perspective view of a portion of the interior of the vehicle;

Figure 2 is a diagram showing the connection between the accelerator pedal and throttle of the engine;

Figure 3 is a diagram illustrating the means for actuating the signal; and

Figure 4 is a front elevational view of the speed indicating instrument having certain parts broken away for the sake of clearness.

As briefly indicated above, the present invention contemplates imparting a tactual signal to a part of the anatomy of the operator when the vehicle attains, or exceeds, a speed preselected by the operator. As will be presently set forth, the tactual signal comprises means for directing a current of hot air against the ankle of the operator's foot employed to manipulate the accelerator pedal. Accordingly, the tactual signal merely serves as a warning to the operator and does not interfere with the conventional manipulation of the accelerator pedal to control the speed of the engine. In other words, the operator may ignore the signal entirely and accelerate the vehicle to its maximum speed, if he desires.

In the embodiment of the invention selected herein for the purpose of illustration, the tactual signal is in the form of a small capacity blower 10 driven by an electric motor 11 and secured to the toeboard 12 of the vehicle body in a position wherein the discharge conduit 13 is directed toward the accelerator pedal 14. It will be observed from Figure 1 that the arrangement is such that air discharged from the blower 10 is directed by the conduit 13 against the ankle of the foot of the operator employed to manipulate the accelerator pedal 14. The accelerator pedal is diagrammatically shown in Figure 2 as operatively connected to the engine throttle 15 for actuating the latter to control the speed of the vehicle in accordance with the usual practice.

The operation of the blower 10 is controlled by a speedometer 16 of the fly-ball governor type and supported on the instrument board 17 of the vehicle body in a position to be observed by the operator. The speedometer is shown in Figure 3 as provided with a casing 18 having a dial 19 secured to the forward end thereof and having a speed indicating needle 20 supported in advance of the dial for movement across the face of the latter. The needle 20 is secured to the forward end of a shaft 21 journalled in the front wall of the casing and having the rear end connected to a fly-ball governor 22 through the medium of suitable reduction gearing 23. The governor 22 is of conventional construction having a shaft 24 journalled in opposite side walls of the casing and having collars supported upon the shaft in axial spaced relationship for relative movement toward and away from each other. In the present instance, the collar 25 is secured to the shaft 24 and the opposed collar 26 is mounted on the shaft for axial sliding movement relative thereto. The two collars are interconnected by means of the weight carrying links 27 and the collar 26 is normally urged in a direction away from the collar 25 by means of a coil spring 28 surrounding the shaft 24 between the collars. In accordance with conventional practice, the weight carrying links are arranged in pairs having their outer ends respectively pivotally connected to the collars and having their inner ends pivotally connected through the medium of centrifugal weights 29. The weights 29 move radially outwardly with respect to the axis of the shaft 24 in dependence upon the speed of rotation of the latter shaft and, as the weights are displaced outwardly by the action of centrifugal force, the collar 26 is moved against the action of the spring 28 toward the collar 25.

Upon reference to Figure 3, it will be noted that the collar 26 is operatively connected to the reduction gearing 23 by means of a suitable crank 30 having a pin 31 journalled in a partition 32 in the casing, and secured to the driving gear 33 of the train of reduction gears 23. The crank 30 is also provided with a pin 34 offset with respect to the pin 31 and extending in a direction opposite the latter pin. The free end of the pin 34 engages within an annular groove 35 formed in the collar 26 for actuation thereby. The arrangement is such that movement of the collar 26 axially toward the collar 25 by the centrifugal weights 29 effects a swinging movement of the needle 20 over the outer face of the dial 19 through the medium of the crank 30 and reduction gearing 23.

The shaft 24 of the governor is driven from a selected part of the power plant of the vehicle through the medium of a conventional driving cable 36 operatively connected to a stub shaft journalled in the casing and having a spiral toothed gear 37 secured thereto for meshing engagement with correspondingly spiraled teeth on the shaft 24. Owing to the fact that the diameter of the gear 37 is substantially greater than the tooth portion of the shaft 24, it necessarily follows that this shaft is rotated at a speed proportionately faster than the speed of the driving cable. This practice is usually followed in order to afford maximum accuracy in indicating the speed of the vehicle.

In order to actuate the blower 10 in accordance with the operation of the speedometer 16, a contact segment 38 is secured on the shaft 21 in rear of the dial 19 for rotation as a unit with the needle. It will be apparent from Figure 3 that the peripheral portion of the segment 38 is adapted to engage a contact clip 39 secured to a ring 40 of dielectric material, which in turn is rotatably mounted on the forward end of the casing 18. The periphery of the ring 40 is provided with teeth adapted to mesh with a pinion 41 secured to a shaft 42 journalled on the casing and having a control 43 secured to the forward end thereof in a position to be conveniently manipulated by the operator. The arrangement is such as to vary the position of the contact clip 39 relative to the contact segment 38, and thereby change the speed at which the two contacts are engaged with one another. In this connection, it is to be noted that the contact clip 39 is provided with a pointer 44 located in a position wherein the same is visible from the front side of the instrument and cooperating with the standard indicia on the speedometer dial 19 to form a guide for the operator in adjusting the contact 39. For example, if it is desired to provide for engagement of the contact when the vehicle is traveling thirty miles an hour, the operator merely manipulates the control 43 to position the pointer 44 of the contact clip 39 opposite the numeral 30 on the dial 19. As the segment 38, shown particularly in Figure 4 of the drawing, is rocked by the indicating needle shaft 21 the extent required for the needle to point to the numeral 30, the segment contacts with the clip 39. Referring again to Figure 3 of the drawing, it will be noted that the contact segment 38 is grounded through the casing in the manner indicated by the reference character 45, and the contact 39 is electrically connected to the positive side of a battery 48, through a relay coil 46. The negative side of the battery is grounded, as at 49, and the live side 47 of the relay is electrically connected to the motor 11 of the blower 10 when the contact 46 is drawn against 47 by engagement of the contacts 38 and 39. The motor, in turn, is electrically connected through a heating coil 50 to the ground 45, thereby providing a circuit control by the cooperating engaging contacts 38 and 39.

Referring now to the operation of the warning signal previously described and assuming that the operator desires to be informed when the speed of the vehicle exceeds thirty miles per hour, the contact clip 39 is adjusted by the control 43 to a position wherein the pointer 44 on said clip registers with the numeral 30 on the indicating dial 19 of the speedometer. Inasmuch as the contact segment 38 is rotatable as a unit with the speed indicating needle 20, it necessarily follows that when this needle registers with the numeral 30, the contact segment engages the clip 39. Engagement of the two aforesaid contacts closes the circuit including the coil of the relay and energization of the latter coil effects a movement of the contact 46 into engagement with the contact 47. This closes the circuit to the blower 10 and causes air heated by the unit 50 to be directed against the ankle of the foot of the operator engaged with the accelerator pedal. It will be noted from Figure 4 that the design of the segment is such as to continue the operation of the warning segment throughout the speed range above thirty miles per hour and, as a consequence, the operator is continually aware of the fact that the vehicle is being operated at a higher speed than the one previously selected by him.

What I claim as my invention is:

1. In a motor vehicle, a driver's compartment, a power plant for propelling the vehicle including an internal combustion engine having a throttle, an accelerator pedal located in the driver's compartment and operatively connected to the throttle for varying the speed of the vehicle, and signal means positioned adjacent the accelerator and effective to direct a current of air against the foot of the operator engaged with the accelerator pedal.

2. In a motor vehicle, a driver's compartment, a control member in said compartment normally engaged by the operator, means positioned adjacent said member and effective to direct a current of warmed air toward said control member as a warning signal.

3. In a motor vehicle, a driver's compartment, a control member in said compartment normally engaged by the operator, means positioned adjacent said member and effective to direct a current of warmed air toward said control member as a signal, said means comprising a blower, a discharge conduit, an electric motor for said blower, a circuit for said motor, and electric heating means in said motor circuit and located in said discharge conduit.

4. A tactual signal comprising a blower, a discharge conduit, an electric motor for said blower, a circuit for said motor and electric heating means in said motor circuit and located in said conduit whereby said signal will discharge a stream of warmed air to serve as a tactual signal.

5. A tactual signal for use as a signal means in a motor vehicle and adapted to be positioned adjacent a control member normally engaged by the operator, comprising a blower, a discharge conduit connected to said blower, whereby said signal will discharge a current of air to serve as a tactual signal.

6. A tactual signal for use as a signal means in a motor vehicle and adapted to be positioned adjacent a control member normally engaged by the operator, comprising a blower, a discharge conduit connected to said blower, heating means in said conduit whereby said signal will discharge a current of warmed air to serve as a tactual signal.

STUART H. CALDWELL.